(12) United States Patent
Morgan et al.

(10) Patent No.: US 7,693,838 B2
(45) Date of Patent: Apr. 6, 2010

(54) METHOD AND APPARATUS FOR SECURELY ACCESSING DATA

(75) Inventors: Dennis Morgan, Pine Grove, CA (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 11/271,228

(22) Filed: Nov. 12, 2005

(65) Prior Publication Data

US 2007/0112772 A1 May 17, 2007

(51) Int. Cl.
*G06F 17/30* (2006.01)
*H04L 29/06* (2006.01)

(52) U.S. Cl. .............................. 707/9; 707/10; 707/201; 713/161

(58) Field of Classification Search ....................... 707/9, 707/10, 201; 709/217–224; 713/161; 705/76
See application file for complete search history.

(56) References Cited

U.S. PATENT DOCUMENTS

| | | | | | |
|---|---|---|---|---|---|
| 4,853,843 | A | * | 8/1989 | Ecklund ...................... | 707/203 |
| 5,177,789 | A | * | 1/1993 | Covert ........................ | 713/184 |
| 6,085,191 | A | * | 7/2000 | Fisher et al. ................. | 707/9 |
| 6,158,010 | A | * | 12/2000 | Moriconi et al. ............... | 726/1 |
| 6,236,996 | B1 | * | 5/2001 | Bapat et al. ..................... | 707/9 |
| 6,279,111 | B1 | * | 8/2001 | Jensenworth et al. ........ | 726/10 |
| 6,327,613 | B1 | * | 12/2001 | Goshey et al. .............. | 709/208 |
| 6,637,027 | B1 | * | 10/2003 | Breslauer et al. ............. | 725/25 |
| 7,376,125 | B1 | * | 5/2008 | Hussain et al. .............. | 370/352 |
| 7,376,974 | B2 | * | 5/2008 | Proudler et al. .............. | 726/27 |
| 2003/0061263 | A1 | * | 3/2003 | Riddle ........................ | 709/104 |
| 2006/0026042 | A1 | * | 2/2006 | Awaraji et al. ................. | 705/3 |
| 2006/0129496 | A1 | * | 6/2006 | Chow et al. ................... | 705/59 |
| 2007/0028244 | A1 | * | 2/2007 | Landis et al. ............... | 718/108 |
| 2007/0043667 | A1 | * | 2/2007 | Qawami et al. .............. | 705/50 |
| 2007/0113225 | A1 | * | 5/2007 | Felts .......................... | 717/172 |
| 2007/0271369 | A1 | * | 11/2007 | Aydin et al. ................. | 709/224 |

* cited by examiner

*Primary Examiner*—Miranda Le
(74) *Attorney, Agent, or Firm*—Blakely, Sokoloff, Taylor & Zafman LLP

(57) ABSTRACT

A security manager receives a request for data that is subject to data security management. The security manager operates independently of a host partition and is not directly accessible or detectable by the host partition. The security manager determines whether to grant or deny access to the requested data based at least in part on a requesting user's authentication credentials. If the data request is approved, a security policy associated with the data is determined. In addition, instructions are sent to a system hypervisor to create a secure partition. The hypervisor loads the requested data and a verified version of an application necessary to access the data into the secure partition creating a secure environment for accessing the data.

14 Claims, 5 Drawing Sheets

METHOD AND APPARATUS FOR SECURELY ACCESSING DATA

FIELD

Embodiments of the invention relate to security of computing devices, and more particularly to enterprise digital rights management.

BACKGROUND

Malware is a type of software designed to take over and/or damage a computer user's operating system, without his or her knowledge or approval. Once installed on a user's computer, it is often very difficult to remove, and depending on the severity of the program installed, its effects can range in degree from minimal and annoying (e.g. unwanted pop up ads), to irreparable damage requiring the reformatting of the computer's hard drive, since much of malware is poorly written.

Malware attacks often compromise the ability to determine with certainty the identity of a software program and may be classified as different types for purposes of discussion herein. Other classifications are possible. For purposes of description, the true software program to which the identity belongs may be referred to as the program of interest. One type of attack is one in which an attacker attempts to stop the program of interest from executing. Stopping execution of the program of interest can be accomplished by crashing the program or an operating system on which the program is running by modifying the machine code to result in an invalid machine instruction or other fatal fault. Alternately, data associated with the program of interest could be modified, for example, to cause a segmentation fault by changing an array bound. As another alternative, the program could be unloaded from the process table of a task manager to prevent the program from being scheduled for execution.

Another type of attack involves the attacker modifying the program of interest to cause it to perform an operation other than what was originally intended for the program. For example, an attacker may use the compromised host system to execute code to propagate a worm, or code to perform a denial of service attack against a remote target. One way to cause the program of interest to perform an unintended operation is exploitation of an input buffer or stack overflow vulnerability.

Another type of attack involves tampering with the program of interest. Program tampering is demonstrated when an attack successfully modifies the program of interest and attempts to hide its modifications. Hiding its modifications can be considered a form of covering the attacker's tracks. An example of program tampering is an attack that modifies the program of interest, executes the modifications, and then removes the modifications to restore the program of interest to its original state.

Two specific types of malware are trojan horses and spyware. Trojan horses can erase or overwrite data on a computer, corrupt files, set up networks of zombie computers to launch denial of service attacks or send spam, log keystrokes to steal passwords and credit card numbers, and install a backdoor on computers. Spyware allows an attacker to spy on the user of a computer and secretly report information such as browsing habits to other people.

Certain types of malware, such as trojan horses and spyware, mentioned above, do not directly spread in the manner of a computer virus or worm. In other words, an infected system generally does not attempt to transmit the infection to other computers. Rather, this type of malware gets onto a host system by deceiving a user or through exploitation of software vulnerabilities. The most direct route by which this malware can get on a computer involves the user installing it. However, users are unlikely to install software if they know that it may disrupt their working environment and compromise their privacy. Thus, many malware programs deceive the user, either by piggybacking on a piece of desirable software, or by tricking the user into doing something that installs the software without the user realizing it. An example might be a user opening and/or saving an attachment sent in an email which appears to be a harmless file but actually contains malicious code. Once infected data is accessed by the host system, the infection can propogate to the entire system.

Methods and apparatuses for securely accessing data are disclosed. A host computer receives a request for data subject to digital rights management (DRM). In response to receiving the request a data security policy is determined for the requested data including determining an access level to the requested data for the requester. The host computer system determining whether to grant access to the requested data based at least in part on a credential of the requester.

In response to granting access to the requested data, the host computer system creates a secure virtual partition in which to execute a software application to enable the requester to access the data. The secure virtual partition is independent of any other operating system running on the host computer and isolated from any other partition on the host computer.

The host computer system performs an integrity check on a version of the software application and loads the integrity-verified version of the application into the secure virtual partition. The host computer system then provides access to the requested data via the application according to the determined access level of the requester.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
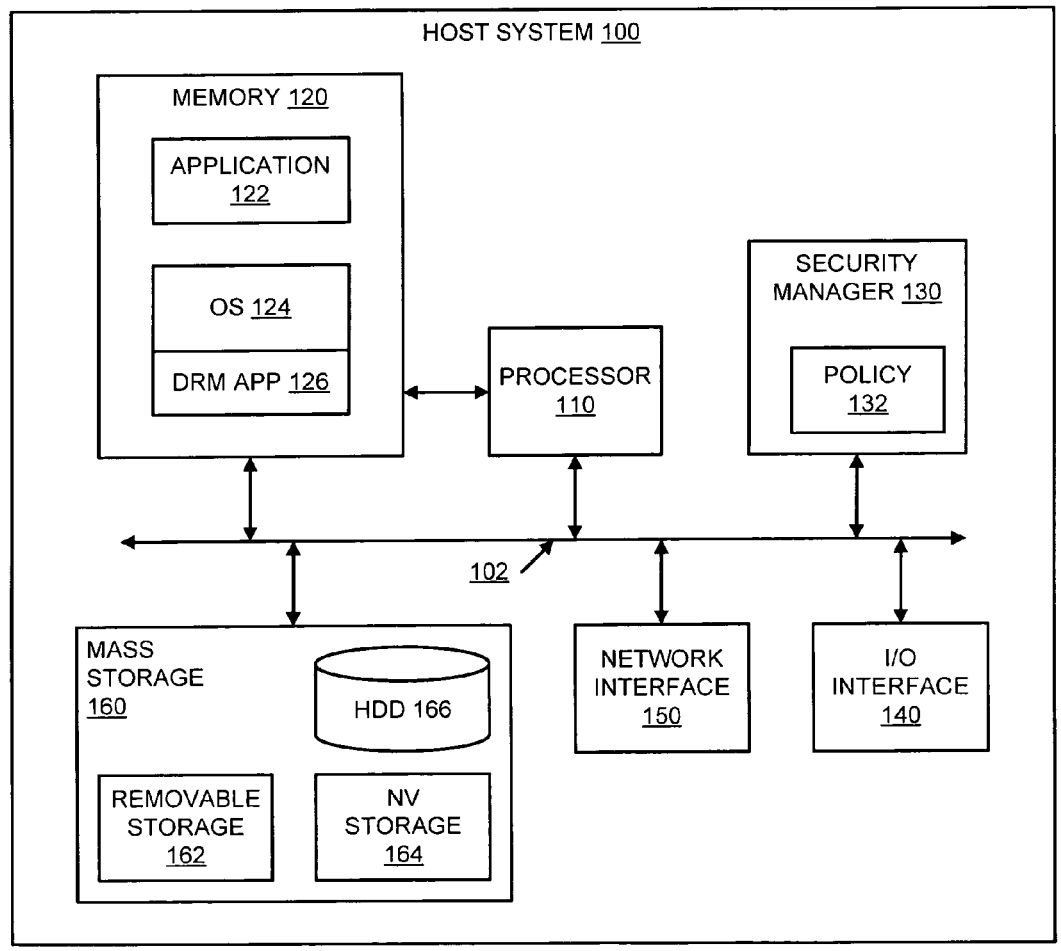
FIG. 1 is a block diagram of an embodiment of a system with a security manager.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Digital rights management (DRM), or data security management, is a broad term referring to any of several technical methods used to control or restrict the use of digital content on electronic devices with such technologies installed. In more specifics, DRM refers to a policy service in an enterprise that controls one or more of data classification, authentication (of a user), authorization to use data, and non-repudiation (attestation of a user's identity, e.g., via a digital certificate). The content most often restricted by DRM techniques include music, visual artwork, computer and video games, and movies. However, DRM may be employed to control any digital content, including documents, text files, data lists, application programs, and any other data.

In one embodiment of the invention, a user requests data that is controlled by data security management/digital rights management (DRM). As used herein, a request is to be understood as an exchange in either direction of data between a memory and a storage. A memory refers generally to volatile system memory, and a storage refers to a non-volatile storage. A request also refers to access or calling of data by a processor or central processing unit (CPU) from a memory (e.g., cache, random access memory (RAM)). Data refers to a grouping of one or more bits of information.

The user's request is received by a security manager. The security manager may include a service processor, either as separate hardware or as a secure partition, thread, virtual machine, etc., in the host system, and one or more software/firmware modules executing on the service processor to provide management/monitoring functions. A security module with a measurement engine could provide certain services to provide safeguards against the types of malware attack mentioned above. These services may include at least: detecting a state of the measured program's execution (e.g., agent presence), detecting if the measured program's executable code or configuration data has been modified in memory, and detecting if the measured program's configuration data has been modified by another entity. In one embodiment, the security manager includes ACTIVE MANAGEMENT TECHNOLOGY (AMT), available from INTEL CORPORATION of Santa Clara, Calif.

The security module on the platform is independent of one or more operating systems on the platform. As used herein, operating system independent refers to the concept that the operating system generally will not detect or have the ability to directly access the security module. A security module that is independent of the operating system is not subject to the same vulnerability of attack as the operating system. Thus, if the operating system is compromised or attacked, the integrity of the security module should remain unaffected. Besides being referred to as operating system independent, such a system may be referred to as "out of band," logically "below" the operating system, or by other terms that imply the concept that the security module does not generally require hardware or software controlled/managed by the operating system to exist. However, the functions of the security module may implicate hardware/software controlled by the operating system.

As discussed above, the security manager receives the request for DRM-controlled data. The requested data can be a document, file, list, image, video, audio clip or other data. The user may access the data for viewing, editing, modifying, copying, and/or transferring the data, but is not limited to these uses.

In one embodiment, the security manager sends the data request to a DRM server on a network. The security manager may access the DRM server via a wireless local area network (WLAN) or other wireless network connection. The DRM server may also be accessed via a Gigabit Ethernet connection as defined by the Institute of Electrical and Electronics Engineers (IEEE) Std. 802.3, 1998, or some variant thereof. One of ordinary skill in the art will appreciate that other types of network connections can also be utilized without deviating from the spirit and scope of the invention.

In one embodiment, the DRM server proxies the authentication and authorization request to an identity management (IDM) Role Based Access Control (RBAC) system after receiving the data request. The IDM RBAC system approves or denies the request based on the requesting user's authentication/authorization credential. If the request is approved, notification is sent from the IDM RBAC system back to the DRM server approving the user to access the requested data. The approval is granular in the sense that a level of access can accompany the approval. In other words, an approved request can provide for a range of access to the requesting user, from read-only access to full and complete access depending on the user's credentials and/or other authentication information. The DRM server returns the approval to the security manager with instructions for the creation of a new partition and subsequent document transfer.

In one embodiment, instructions for creating a new partition are sent to a system hypervisor. A hypervisor is a computing device and/or scheme allowing multiple operating systems to run, unmodified, on a host computer at the same time. In order to have multiple operating systems running simultaneously, the hypervisor virtually partitions the host computer. In other words, a separate virtual partition is created for each operating system such that each operating system is independent of any other operating systems running on the host computer. Everything that takes place within the bounds of the virtual partition is isolated from other partitions and from the computer hardware itself.

In one embodiment, a hypervisor creates a new partition with security controls based on the instructions received from the security manager. In addition, the hypervisor adds the requested data and a "known good version" of an application for accessing the data to the new partition, and assigns the approved level of access. As used herein, "known good version" refers to a version of software that verifies or has been verified to have integrity. Software integrity can refer to a verification that the software program is what it claims to be, that the software has not been modified since being installed, that the software is loaded from an expected location, and/or that the software passes some other identity/integrity check. Techniques for performing integrity check may include the use of integrity check values, which are values that represent an unmodified or known correct state of software. The software can be compared from the system memory to the integrity check value to verify integrity of the software. These and other techniques are described in more detail in application Ser. No. 11/173,851, entitled "Signed Manifest For Run-Time Verification of Software Program Identity and Integrity," of Schluessler et al., filed Jun. 30, 2005. Other forms of verification may also be used.

Thus, the invention allows a system to isolate applications required to create/access/modify data by placing them into separate and secure partitions. This isolation provides protection against malicious code such as trojan horses and spyware.

Needed applications may be delivered to a secure partition each time the user needs to access data. To insure that the applications being used are not compromised or otherwise affected, the hypervisor loads a "known good version" of an application to the partition when required. As used herein, a "known good version" of an application is one that has been verified to be free from defects, infections, etc.

More particular description of certain implementations and embodiments follows in reference to the Figures.

FIG. 1 is a block diagram of an embodiment of a system with a security manager. Host system 100 represents an electronic system or computing system. For example, host system 100 can be a mobile computing device or mobile computing platform. Mobile computing devices may include laptop computers, handheld computing systems, personal digital assistants (PDAs), smart phones, etc. Host system 100 may also be a desktop computer, a server-type computer, or a workstation. Host system 100 includes bus or bus system 102. Bus 102 is understood to be any number of lines, components, bridges, etc., to provide interconnectivity among multiple platform components. Bus 102 may include one or more multi-drop and/or single drop communication paths. Bus 102 represents one mechanism for coupling components with one another. Other forms of interconnection or coupling could be used. As used herein, coupled does not necessarily mean physically connected, although it may. Coupled or interconnected could mean physical connectivity, communicative coupling, and/or electrical coupling.

Processor 110 represents one or more computing elements of host system 100. Processor 110 can be any type of computing element, and may include one or more central processing units (CPUs), processing cores, digital signal processors (DSPs), programmable logic devices (PLDs), microcontrollers, etc., or some combination of these. Processor 110 generally provides computing resources to host system 100, and executes the main operations of host system 100. Processor 100 provides a hardware environment on which to execute a host operating system. Host system 100 also includes memory 120, which may include one or more components of random access memory (RAM), including dynamic RAM (DRAM), synchronous DRAM (SDRAM), dual data rate RAM (DDR RAM), etc., or some combination of these. Memory 120 may also be understood as including one or more elements of cache. In general memory 120 provides temporary storage to provide instructions and data for processor 110 to compute/execute. Memory 120 can provide a resource into which to load programs to be executed on host system 100. Among other data or instructions stored in memory 120, memory 120 can include one or more applications 122 and an operating system (OS) 124. OS 124 is a main component of a software computing environment of host system 100.

In one embodiment, memory 120 also includes digital rights management (DRM) application 126, which represents one or more software components that interfaces OS 124 with security manager 130. DRM application 126 may be a native component of OS 124, or may exist as a separate application, function, dynamic linked library (DLL), etc. DRM application 126 provides communication between OS 124 and security manager 130. for example, DRM application 126 may provide information to security manager 130 regarding data and/or receive information from security manager 130 regarding security to apply to data.

Host system 100 also include one or more input/output (I/O) interfaces 140, which represent one or more components to provide interactivity with a user and/or interconnection with peripheral components and devices of host system 100. Host system 100 may include one or more network interfaces 150, which may be wired and/or wireless. Network interface 150 represents both hardware components (e.g., interface circuits, interface ports, controllers) as well as software components to run the hardware components (e.g., drivers), for either or both of wired or wireless interfaces.

Host system 100 includes mass storage 160, which represents one or more components to store data and/or programs in a non-volatile manner. Non-volatile storage is storage that maintains its information even if power is removed to the storage device. Thus, mass storage 160 may include one or more removable storage devices 162 (e.g., optical/magnetic disk drives), non-volatile storage 164 (e.g., flash or other semiconductor-based storage system, including universal serial bus (USB) storage compatibility), or magnetic hard disk drives (HDD) 166, or some combination of these.

In one embodiment, host system 100 includes security manager 130 to monitor and/or manage security for data in host system 100. Security manager 130 represents a security module according to any embodiment discussed herein. Security manager 130 includes policy 132, which represents either one or more security policies stored locally to security manager 130 or one or more security policies obtained remotely from host system 100 (e.g., over network interface 150), or some combination. Policy 132 provides rules related to the access, use, and/or dissemination of data with which policy 132 is associated. Security manager 130 is independent of OS 124, and provides management of security policy that is abstracted away from the context of the host operating system of host system 100.

Figure 2A:
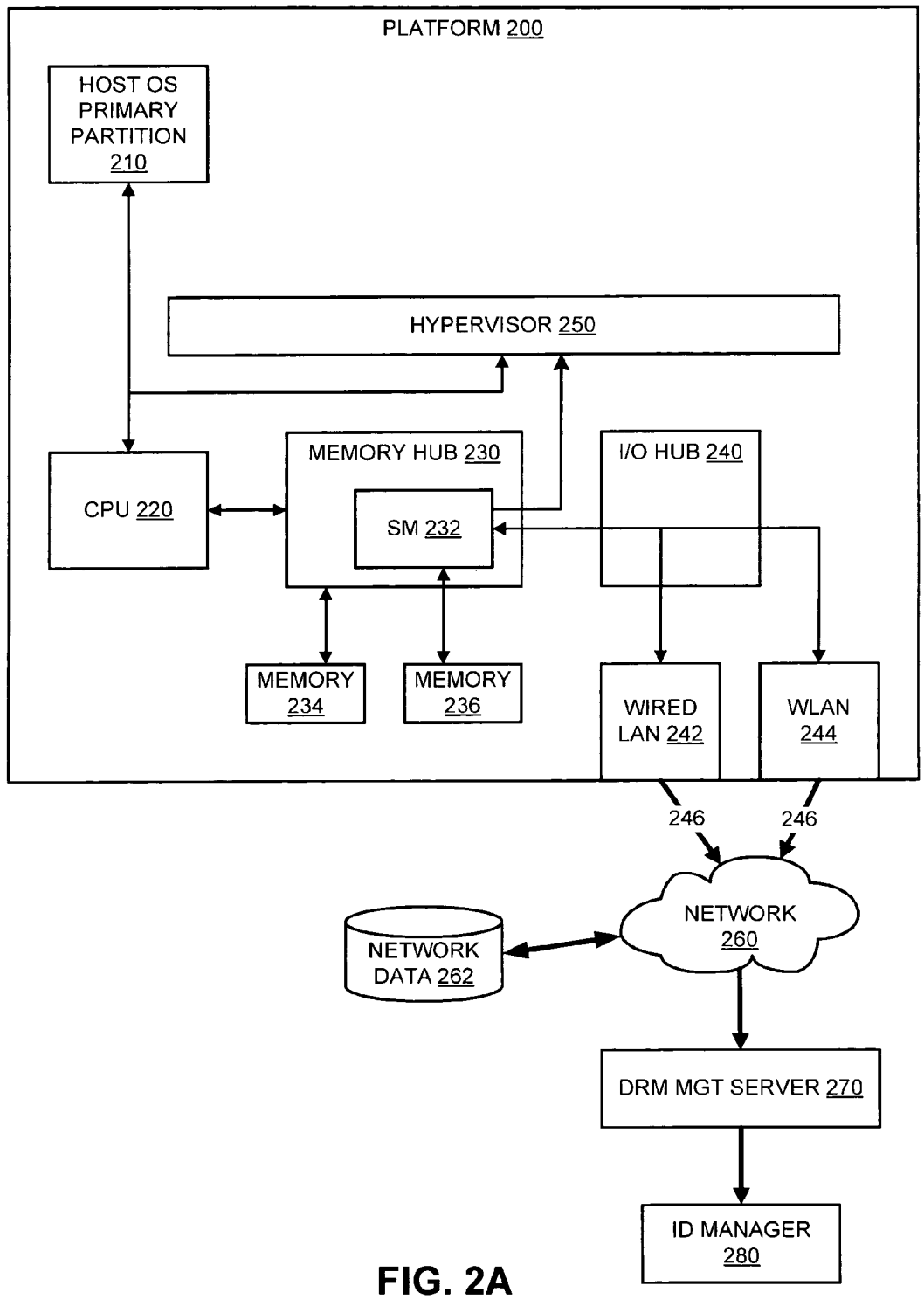
FIG. 2A is a block diagram of an embodiment of a system showing a security manager.

FIG. 2A is a block diagram of an embodiment of the invention showing a platform 200 with a hypervisor 250 and a security manager 232. In one embodiment, a user makes a request to access data from the host operating system's primary partition 210. The data request can be processed by CPU 220 and then sent to memory hub 230. Within memory hub 230, the data request is received at the security manager 232. The security manager may consist of or include one or more hardware and/or software component(s) that operate outside the context of the primary partition 210. By running independently of, or in a manner/mode inaccessible by, the host operating system, the security manager 232 may have monitoring/management capabilities and/or security attributes not present in the context of the host operating system.

In one embodiment, security manager 232 determines a data security policy associated with the requested data. In one embodiment, security manager 232 determines the data security policy by processing the request locally. In another embodiment, security manager 232 determines the data security policy by forwarding the data request over a network 260 to DRM management server 270. The security manager 232 can access the network via wired local area network (LAN) 242 or via wireless LAN (WLAN) 244. DRM management server 270 proxies the data request to an ID manager 280. Specifically, ID manager 280 approves or denies the data request based on the requesting user's authentication and/or authorization credential.

A requesting user may receive authorization to access certain data but not other data. In other words, access to data is restricted on different levels to different users. In an illustrative example, the chief financial officer (CFO) of a company is granted access to sensitive company financial documents based on his/her authentication credential while a summer intern is denied access to those same documents based on his/her authentication credential.

Figure 2B:
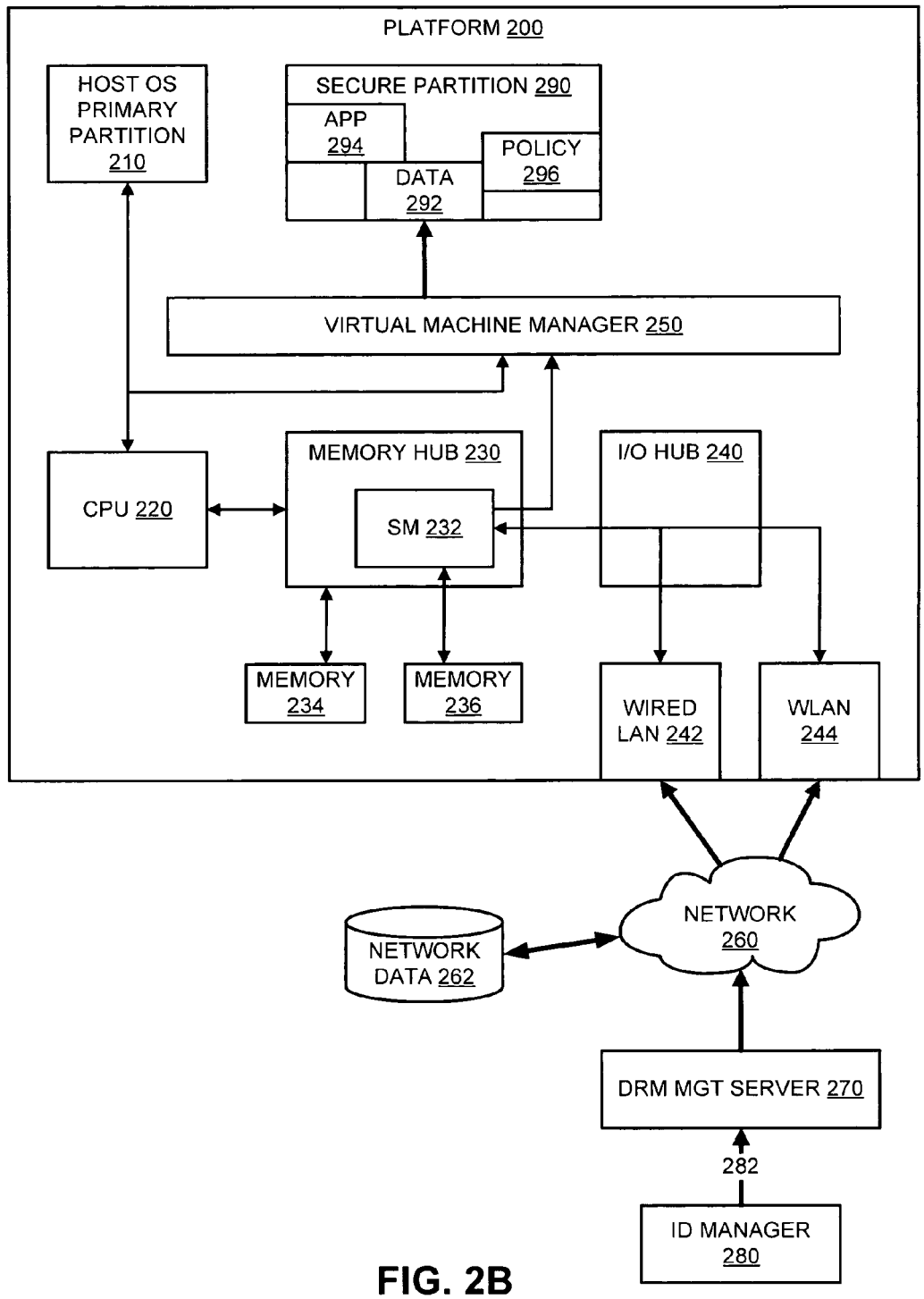
FIG. 2B is a block diagram of an embodiment of a system showing a security manager.

Continuing with FIG. 2B, once the ID manager 280 approves or denies the data request, notification may be sent back to DRM management server 270. Where the notification includes an approval for the data request, DRM management server 270 may further develop the data security policy associated with the requested data by determining a level of access to the data for the requesting user. In one embodiment, the user is granted fall and complete access to the data. For example, the user may be given the ability to read, modify, copy/save, and/or print the requested data. In another embodiment, a user is given partial access to the data, for example the user may only be given read access to the data.

In one embodiment, the level of access to the data also depends on the type of data being requested. For security or other reasons, data of one type may be associated with a higher level of access than data of another type. The data type may be determined/distinguished based on a file type, data size, frequency of use of the data, or other characteristics.

In addition to determining a level of access to the data, the DRM management server 270 may also create instructions for a new partition to be created in connection with accessing the data. A new partition may be required given the nature of the data, the source of the request, or other factors that might cause DRM management server 270 to instruct that access to the requested data be isolated by the use of a partition. In one embodiment, not all data needs to be accessed in a separate partition. Only when DRM management server 270 determines that data needs to be accessed in a separate partition does the system create a new partition. In one example, DRM server 270 determines that all accesses to network data 262 be approved only where the requested data is accessed within a new and secure partition. Thus, if the network data contains malicious code or is otherwise infected, the extent of the damage that the infected data can cause is limited to the partition within which the data is being accessed. In another example, DRM server may determine that all data requests stemming from an email attachment be approved only where the requested data is accessed within a new and secure partition.

Referring again to the embodiment illustrated in FIG. 2B, DRM management server 270, having determined the associated security policy, sends the approval and the security policy back to the security manager 232 via wired LAN 242 or WLAN 244. Having received the approval, security manager 232 retrieves the data from the network 262.

Security manager 232 then sends the retrieved data, the data security policy, a known good version of the application needed to access the data, and the instructions to create a new partition to the hypervisor 250. Hypervisor 250 creates a secure partition 290 and add the known good version of the application 294 along with the data 292 and the associated security policy 296. In this way, a secure environment may be created in which to access the data 292.

Figure 3:
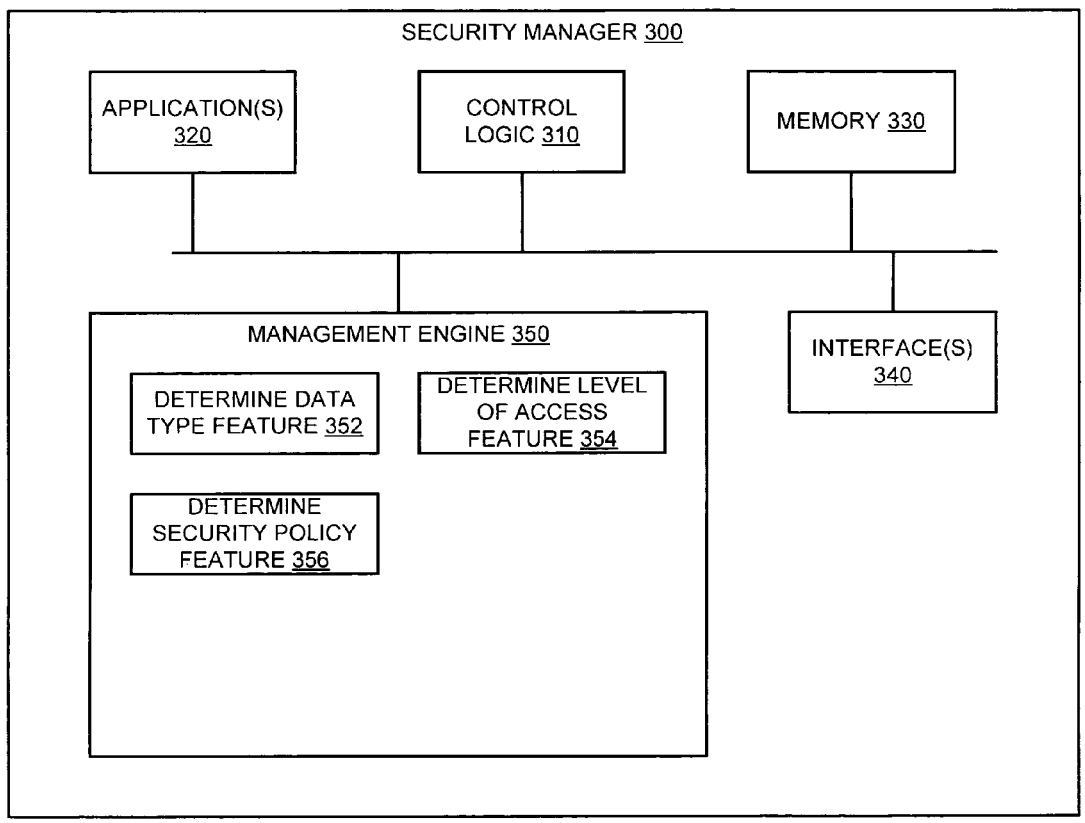
FIG. 3 is a block diagram of an embodiment illustrating a security manager.

FIG. 3 is a block diagram of an embodiment of a security manager. In one embodiment of the invention, the security manager handles data requests internally rather than sending them to a DRM server on a network. Security manager 300 includes control logic 310, which implements logical functional control to direct operation of security manager 300, and/or hardware associated with directing operation of security manager 300. Logic may be hardware logic circuits and/or software routines. In one embodiment, security manager 300 includes one or more applications 320, which represent code sequence and/or programs that provide instructions to control logic 310. Security manager 300 includes memory 330 and/or access to memory resource 330 for storing data and/or instructions. Memory 330 may include memory local to security manager 300, as well as, or alternatively, including memory of the host system on which security manager 300 resides. Security manager 300 also includes one or more interfaces 340, which represent access interfaces to/from security manager 300 with regard to entities (electronic or human) external to security manager 300. Interfaces 340 may include interfaces from security manager 300 to other components of a host system on which security manager 300 resides, as well as interfaces to entities external to the host system.

Security manager 300 also includes management engine 350, which represents one or more functions that enable security manager 300 to provide management of system resources. The functions include, or are provided by, one or more of determine data type feature 352, determine level of access feature 354, and determine security policy feature 356. Other features may be included, making other versions of management engine 350 that are more or less complex than what is shown. As used herein, feature may refer to a function, a module, a routine, a subsystem, etc., whether hardware, software, or some combination. Thus, "feature" should be interpreted in an illustrative, and not a restrictive sense. Each feature could be a module within security manager 300.

Determine Data Type feature 352 enables management engine 350 to determine the type of data that is subject to a data request. In one embodiment, Determine Data Type feature 352 separates a data type field from the data request. In another embodiment, Determine Data Type feature 352 includes the ability to access a memory manager of the primary host partition to look up or otherwise determine a data type based on a file extension.

Determine Level of Access feature 354 enables management engine 350 to determine a level of access to the data for a requesting user. Determine Level of Access feature 354 may determine the level of access based on the requesting user's authentication credentials, the determined data type, or a combination of these.

Determine Security Policy feature 356 enables management engine 350 to determine the security policy for the requested data. Determine Security Policy feature 356 may determine the security policy based on the type of data being requested and the level of access to the data granted for the requesting user. The security policy may also include instructions for creating a secure partition within which the data may be accessed.

Security manager 300 may include hardware, software, and/or a combination of these. In a case where security manager 300 includes software, the software data, instructions, and/or configuration may be provided via an article of manufacture by a machine/electronic device/hardware. An article of manufacture may include a machine accessible medium having content to provide instructions, data, etc. The content may result in an electronic device, for example, a filer, a disk, or a disk controller as described herein, performing various operations or executions described. A machine accessible storage medium includes any mechanism that provides (i.e., stores and/or transmits) information/content in a form accessible by a machine (e.g., computing device, electronic device, electronic system/subsystem, etc.). For example, a machine accessible storage medium includes recordable/non-recordable media (e.g., read only memory (ROM), random access memory (RAM), magnetic disk storage media, optical storage media, flash memory devices, etc.). A machine propagation medium includes electrical, optical, acoustical or other forms of propagated signals (e.g., carrier waves, infrared signals, digital signals, etc.), etc. The machine accessible storage medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 4:
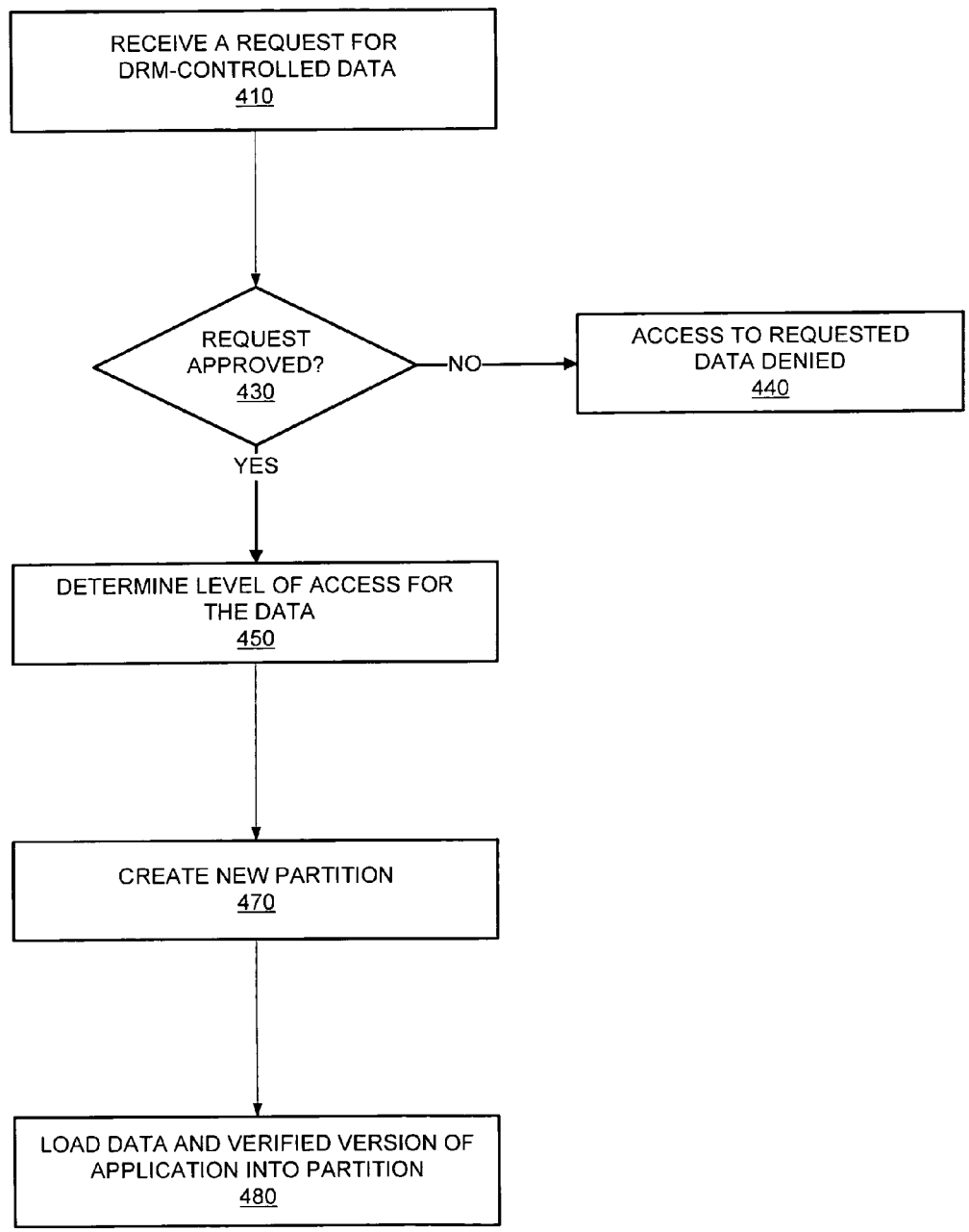
FIG. 4 is a flow diagram of an embodiment of the invention.

FIG. 4 is a flow diagram illustrating an embodiment of the invention. In one embodiment, a request is received for DRM-controlled data, 410. The request can be for reading, creating, copying, or modifying data that is, or will be, controlled by DRM. A security manager or other secure device that is isolated from the primary operating system receives the request. In one embodiment, the request is sent to a DRM server to verify the requesting user's authentication credentials. In this embodiment, the DRM server determines whether to approve or deny the request 430 based, at least in part, on the user's authentication credentials. If the DRM server does not approve the request, then access to the data is denied 440. However, if the request is approved, the DRM server determines the level of access to the data for the requesting user 450. In another embodiment, the request is processed locally in the security manager, including determining the level of access to the data for the requesting user. In one embodiment, the user is granted full access to the data, allowing the user to view, modify, copy, or move the requested data. In another embodiment, the user is granted some other level of access to the data. Instructions are sent to a hypervisor to create a new virtual partition 470 within which the user may access the requested data. Once the new partition has been created, a verified version of the application needed to access the data is loaded into the partition 480 along with the requested data. Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
receiving, by a host computer, a request for data, wherein the data is subject to data digital rights management (DRM);
determining, in response to receiving the request, a data security policy for the requested data, including determining an access level to the requested data for the requester, wherein the data security policy is based at least in part on a type of the data, wherein the type of the data is based at least in part of one or more of a file type, a data size, and a frequency of use of the data;
determining whether to grant access to the requested data based at least in part on a credential of the requester;
in response to granting access to the requested data, providing creating a secure virtual partition in which to execute a software application to enable the requester to access the data, wherein the secure virtual partition is independent of any other operating system running on the host computer and isolated from any other partition on the host computer;
performing an integrity check on a version of the software application; loading the integrity-verified version of the application into the secure virtual partition; and
providing access to the requested data via the application according to the determined access level of the requester.

2. The computer-implemented method of claim 1, wherein the request for data is received by a security manager.

3. The computer-implemented method of claim 2, wherein determining the data security policy comprises:
forwarding at least a portion of the request to a digital rights management (DRM) server on a network; and
processing a response to the forwarded request to determine the data security policy.

4. The computer-implemented method of claim 2, wherein determining the data security policy comprises retrieving the data security policy from a local memory in the security manager.

5. The computer-implemented method of claim 1, wherein the data security policy comprises access and use controls for data.

6. The computer-implemented method of claim 1, wherein the credential is based, at least in part, on one or more of a requester's identity, a requester's location, and a digital certificate.

7. A processor comprising:
a host partition to initiate a data request for data that is subject to digital rights management (DRM);
a security manager to receive the data request, determine whether to allow access to the requested data based at least in part on a credential of the requester, and determine a security policy for the data and an access level for the requester, wherein the data security policy is based at least in part on a type of the data, wherein the type of the data is based at least in part of one or more of a file type, a data size, and a frequency of use of the data, and wherein the security manager is not directly accessible or detectable by the host partition;
a hypervisor to receive an instruction from the security manager to generate a secure virtual partition in which to execute a software application to enable access to the requested data according to the determined access level of the requester and to load a known secure version of the application, wherein the secure virtual partition is independent of any other operating system running on the host computer and isolated from the host partition; and
a secure memory to locally store the verified version of the application.

8. The processor of claim 7, wherein the security manager forwards at least a portion of the data request to a data rights management (DRM) server on a network and processes a response to the forwarded request to determine whether to allow access to the requested data and to determine the data security policy.

9. The processor of claim 7, wherein the data security policy is based at least in part on authentication credentials of the requester.

10. The processor of claim 7, wherein the verified version of an application is stored on a network.

11. A computer-readable storage medium having instructions stored thereon that, when executed, cause a computer to:
receive, by a host computer, a request for data, wherein the data is subject to digital rights management (DRM);
determine, in response to receiving the request, a data security policy for the requested data, including determining an access level to the requested data for the requester, wherein the data security policy is based at least in part on a type of the data, wherein the type of the data is based at least in part of one or more of a file type, a data size, and a frequency of use of the data;
determine whether to grant access to the requested data based at least in part on a credential of the requester;
in response to granting access to the requested data, create a secure virtual partition in which to execute a software application to enable the requester to access the data, wherein the secure virtual partition is independent of any other operating system running on the host computer and isolated from any other partition on the host computer;

perform an integrity check on a version of the software application;

load the integrity-verified version of the application into the secure virtual partition; and providing access to the requested data via the application according to the determined access level of the requester.

12. The computer-readable storage medium of claim 11, wherein the instructions that cause the determining of the data security policy comprise further instructions that cause the computer to:

forward at least a portion of the request to a digital rights management (DRM) server on a network; and process a response to the forwarded request to determine the data security policy.

13. The computer-readable storage medium of claim 11, wherein the data security policy comprises access and use controls for data.

14. The computer-readable storage medium of claim 11, wherein the credential is based, at least in part, on one or more of a requester's identity, a requester's location, and a digital certificate.

* * * * *

UNITED STATES PATENT AND TRADEMARK OFFICE
CERTIFICATE OF CORRECTION

PATENT NO. : 7,693,838 B2  
APPLICATION NO. : 11/271228  
DATED : April 6, 2010  
INVENTOR(S) : Morgan et al.

Page 1 of 1

It is certified that error appears in the above-identified patent and that said Letters Patent is hereby corrected as shown below:

In column 9, at line 53 after, -- data, -- delete "providing".

Signed and Sealed this
Twenty-fifth Day of January, 2011

David J. Kappos
*Director of the United States Patent and Trademark Office*